United States Patent [19]

Andrews et al.

[11] 4,356,678
[45] Nov. 2, 1982

[54] COMPOSITE STRUCTURE

[75] Inventors: Merritt B. Andrews, Westfield, Mass.; Edward A. Rothman, South Glastonbury, Conn.

[73] Assignee: United Technologies Corporation, Hartford, Conn.

[21] Appl. No.: 238,259

[22] Filed: Feb. 25, 1981

Related U.S. Application Data

[63] Continuation of Ser. No. 972,570, Dec. 22, 1978.

[51] Int. Cl.$^3$ .............................................. E04C 2/32
[52] U.S. Cl. ...................................... 52/799; 52/600; 52/630; 52/309.16
[58] Field of Search ................ 52/795, 799, 800, 600, 52/309.16, 630, 731, 785, 793; 244/123, 126, 133; 428/113

[56] References Cited

U.S. PATENT DOCUMENTS

| | | | |
|---|---|---|---|
| 2,644,777 | 7/1953 | Havens | 52/800 X |
| 3,196,942 | 7/1965 | Prentiss | 165/166 |
| 3,217,845 | 11/1965 | Reynolds et al. | 52/799 X |
| 3,265,129 | 8/1966 | Bawabe | 165/166 |
| 3,284,980 | 11/1966 | Dinkel | 52/600 |
| 3,305,991 | 2/1967 | Weismann | 52/600 |
| 3,321,826 | 5/1967 | Lowy | 52/799 |
| 3,606,667 | 9/1971 | Kreider | 29/423 |
| 3,615,277 | 10/1971 | Kreider et al. | 29/195 |
| 3,622,430 | 11/1971 | Jurisich | 244/133 X |
| 3,907,032 | 9/1975 | De Groote et al. | 165/166 |
| 3,975,882 | 8/1976 | Walter | 52/799 |
| 3,995,081 | 11/1976 | Fant | 428/119 |
| 4,051,289 | 9/1977 | Adamson | 428/113 |

FOREIGN PATENT DOCUMENTS

| | | | |
|---|---|---|---|
| 250032 | 11/1962 | Australia | 52/799 |
| 213712 | 6/1941 | Switzerland | 52/799 |

OTHER PUBLICATIONS

"Composites: Designers Wait and Contemplate", P. Sinclair Industrial Research, Oct. 1969, pp. 58–85.

*Primary Examiner*—J. Karl Bell
*Attorney, Agent, or Firm*—John Swiatocha

[57] ABSTRACT

A structural composite panel comprises a pair of filament-reinforced composite facing sheets and a ruffled, corrugated core secured between the facing sheets. The core has corrugations each with an axis having periodic oscillations in plane of the core and with the axis generally normal to filament direction.

6 Claims, 3 Drawing Figures

COMPOSITE STRUCTURE

This is a continuation of application Ser. No. 972,570 filed on Dec. 22, 1978.

BACKGROUND OF THE INVENTION

1. Field of the Invention

The present invention relates to composite structures and more particularly to filament-reinforced composite panels which uniquely incorporate a particular corrugated core between filament-reinforced outer sheets.

2. Description of the Prior Art

With the advent of filament-reinforced composites, the potential of significant improvements in structural materials designed to meet the rigid requirements of space-age hardware was established. The stiffness, strength and light weight of such composites make them eminently suitable for aerospace applications where weight savings result in enormous benefits. Some early discussions of a wide variety of composites appear in Industrial Research, October 1969, pp. 58–85.

Although an intense area of interest and activity has been the consolidation and utilization of filament-reinforced materials of the type described above, some limitations have been recognized. One problem, for example, occurs when a conventional and relatively thick aircraft skin panel made of isotropic metal such as aluminum, steel, titanium, or the like is replaced by a relatively thin sheet of a filament-reinforced composite such as boron-aluminum or graphite-epoxy. Because of its extremely reduced thickness, the composite sheet has reduced buckling resistance and low panel further stiffness which renders it subject to unacceptable deflection, flutter, vibration and resonance during aircraft operation. To obviate these and other drawbacks, it has been suggested that making sandwich panels without undue weight increase is necessary. Unfortunately however common approaches to sandwich construction may produce other problems. It was found for example that the use of honeycomb as a core material results in saddling, i.e., out of plane warping, when that material is formed into a simple curved shape. Other structures, such as those taught in U.S. Pat. Nos. 3,995,081 and 4,051,289, utilize composite materials throughout and for various reasons are not considered satisfactory.

SUMMARY OF THE INVENTION

It is an object of the present invention to overcome the above briefly discussed and other deficiencies and disadvantages of the prior art by providing a novel and improved filament-reinforced composite panel.

The present invention contemplates a composite panel particularly adapted for single plane curvature and comprising the unique combination of a ruffled corrugated core sandwiched between filament-reinforced outer sheets. In one embodiment of the invention, a pair of facing sheets each comprising a plurality of generally unidirectional, spaced, high modulus, high strength filaments embedded in a ductile matrix material are bonded to a central, ruffled corrugated core, the core having a plurality of corrugations formed by parallel alternating ridges and grooves which are generally in the shape of an oscillating waveform and which have axes generally normal to said filaments. In a preferred embodiment, the facing sheets are comprised of boron filament-reinforced aluminum and the core is comprised of titanium having corrugations in the form of a sinusoid.

BRIEF DESCRIPTION OF THE DRAWING

An understanding of the invention will become more apparent to those skilled in the art by reference to the following detailed description when viewed in light of the accompanying drawing, wherein.

DESCRIPTION OF THE PREFERRED EMBODIMENTS

Figure 1:
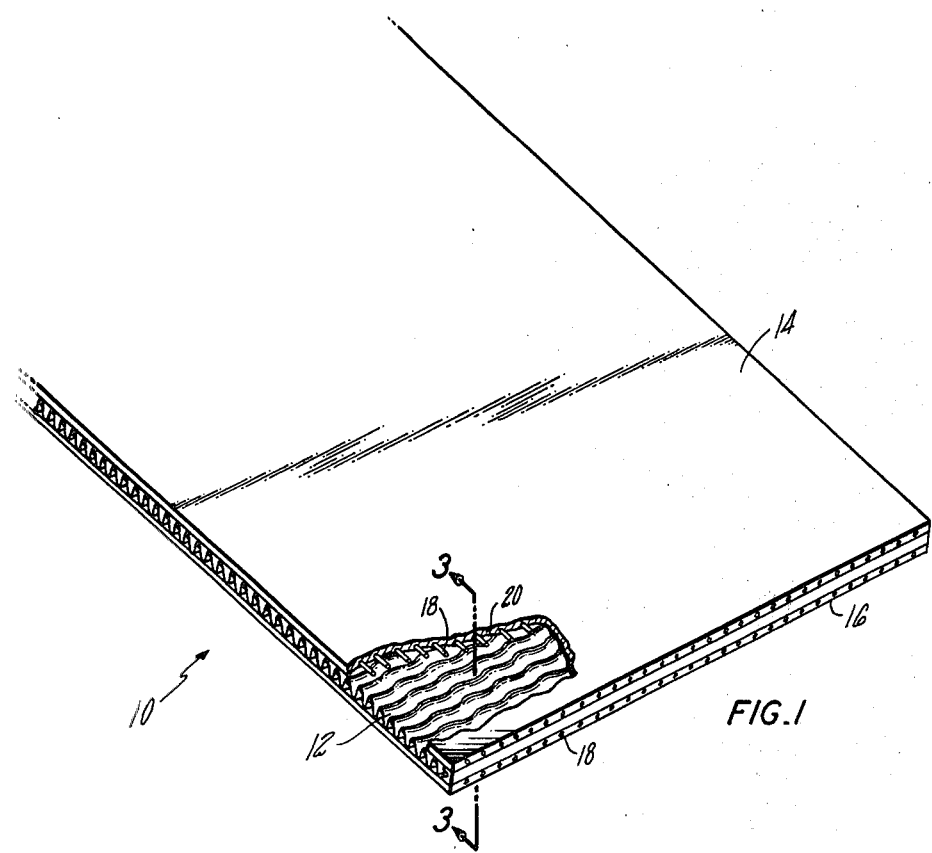
FIG. 1 is an isometric view, partly broken away, of the inventive structure in the form of a flat panel.
Figure 2:
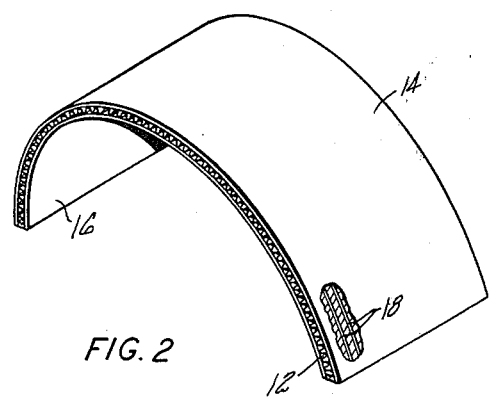
FIG. 2 is an isometric view, partly broken away, of the inventive structure in the form of a simple curved panel.
Figure 3:
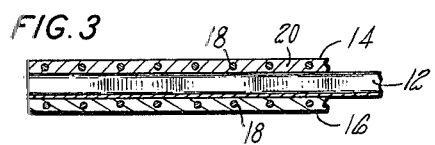
FIG. 3 is a sectional view taken in the direction of line 3—3 of FIG. 1.

Referring to FIGS. 1 and 3, the laminated panel is indicated generally at 10. The panel 10 includes a corrugated core 12 having filament-reinforced sheets 14 and 16 bonded to opposite surfaces thereof. The core 12 is of the ruffled fin type such as those used in heat exchanger cores wherein the alternating parallel channels and ridges making up the corrugations have axes which have periodic oscillations in the plane of the core, preferably in the form of a sinusoid. For utility in aircraft, the core must provide sufficient rigidity in a direction transverse to the axes of corrugation without inhibiting simple bending of the panel 10 into a simple plane curve shape about a straight line generally parallel to said axes (as in FIG. 2). To meet this requirement, the amplitude of the oscillatory wave of these corrugation axes must, as a general rule, be limited to one-half of the pitch, with pitch being defined as the distance between corresponding points on adjacent corrugations. This, of course, may vary somewhat, depending primarily upon the height of the core 12. For example if the height of the core is below 0.050 in., the amplitude may be greater than one-half the pitch and conversely, if the height of the core is over approximately one inch, the amplitude should be somewhat below one-half.

The core 12 may be made of any material which provides the strength and other properties required for its intended application although it is generally a metal. For aircraft panel applications, titanium, aluminum and alloys thereof are generally preferred. The core may be easily fabricated by subjecting metal sheets to conventional die forming techniques.

As shown in FIG. 1, the facing sheets comprise a plurality of filaments 18 embedded in a matrix material 20. Filaments considered suitable are high modulus, high strength, low density filaments, i.e., those having an elastic modulus of at least approximately 15 million psi, a flexural strength of at least approximately 300,000 psi and a density no greater than approximately 0.15 lb./in.$^3$, e.g., boron filaments, coated or uncoated, graphite filaments, silicon carbide filaments and organic filaments such as polymeric aromatic nylon sold by duPont under the trademark KEVLAR PRD 49. Most preferred are filaments of boron, Borsic$_{TM}$ (silicon carbide coated boron filaments commercially available from Composite Technology, Inc. of Broad Brook, Conn.) and graphite.

The filaments may consist of a single layer, as shown, or a plurality of layers, with filaments within each layer generally being parallel, uniformly spaced, and generally oriented normal to the corrugation axis of the core 12. There may be some deviation from normal from one layer to the next, as for example, with a ±30° orientation, so long as reinforcement to normal is provided.

The matrix material 20 may be any suitable material which is compatible with the filaments 18, has sufficient strength to transfer stresses between filaments so that discontinuous filaments may be reloaded, has high enough plastic strain capability to resist fracture under severe localized strain and is suitable for the environment of intended use. Suitable matrix materials are metals such as aluminum, magnesium, titanium and alloys thereof and nonmetals such as an epoxy resin or a high temperature resin such as polyimide, polybenzimadazole, polyoxadiazole or the like.

A typical filament-matrix combination is boron-aluminum as prepared in tape form, for example, according to the teachings of U.S. Pat. No. 3,606,677 to Kreider or U.S. Pat. No. 3,615,277 to Kreider et al (both assigned to the assignee of the present invention) and subsequently densified. The tape is then bonded, either metallurgically, as by diffusion or braze bonding, or physically, as by an adhesive.

The inventive structure has particular applicability as an aircraft skin panel and especially as an aircraft engine casing. Not only is the panel simple and inexpensive to fabricate, lending itself readily to single plane curvature, without saddling, but the core structure also provides a transverse load path with respect to the unidirectionally oriented filament. Being open, it also has the advantages of prohibiting moisture entrapment and allowing enhanced skin cooling by forced air flow through the core.

As an aid to further understanding of the present invention, the following example is illustrative.

EXAMPLE

A pair of one foot square consolidated 3 ply boron-aluminum sheets consisting of unidirectional 5.6 mil boron fiber embedded in 6061 aluminum (fifty volume percent filament content) were prepared for bonding by cleaning with commercial solvent MEK and abrading with sandpaper. A one foot square, 0.3 inch high ruffled core material of commercially pure 0.003 inch thick titanium was then provided which had sinusoidal corrugations spaced apart by 0.25 inch, the axis of each corrugation having a sinusoidal waveform with an amplitude of 0.1 inch and a wavelength of 1 inch. The corrugated core was prepared for bonding by immersion in a caustic cleaning solution of Turco Etch 5578 followed by a water rinse. The top and bottom outer surfaces of the core were coated with commercially available BR-34 primer and cured at 350° F. for thirty minutes in air. The titanium core and the boron-aluminum sheets were assembled in a stack, with the core material sandwiched between the sheets and with the filaments oriented at approximately 90° with the corrugation axes. A 0.006 in. thick sheet of FM-34 polyimide adhesive was inserted between each boron-aluminum sheet and the core, and the stack was inserted into a nylon vacuum bag assembly, sealed and a vacuum of 1 in. Hg established within the bag. The vacuum bag assembly was inserted in a horizontal attitude into an oven preheated to 350° F. and a static weight equivalent of 5 psi applied. The assembly was held at 350° F. for thirty minutes and then removed and air cooled to room temperature. The polyimide was post cured at 600° F. for 2 hours to provide a rigid, unitized article. Both flat and curved panels as shown in the drawings were fabricated in accordance with the above procedure. For the curved panel, as preformed caul plate of the radius prescribed was installed over and under the stack prior to insertion into the vacuum bag. Inconel of 0.125 in. thick sheet and rolled to provide the curved shape was used for this purpose. A similarly curved static weight was used to compact the assembly during bonding.

What has been set forth above is intended primarily as exemplary to enable those skilled in the art in the practice of the invention and it should therefore be understood that, within the scope of the appended claims, the invention may be practiced in other ways than as specifically described.

What is claimed as new and therefore desired to be protected by Letters Patent of the United States is:

1. A structural composite panel comprising:
   first and second facing sheets, each of said facing sheets comprising a plurality of high modulus, high strength reinforcing filaments embedded in a matrix material; and
   a ruffled corrugated core secured between said first and second facing sheets, said core having a plurality of corrugations formed by parallel alternating ridges and grooves, each of said ridges and grooves having a longitudinal axis having periodic oscillations in the plane of said core.

2. The invention according to claim 1 wherein said periodic oscillations define a sinusoid the amplitude of said sinusoid being not greater than one-half the pitch of said corrugations.

3. The invention of claim 1 or 2 wherein said filaments are oriented in a direction generally normal to said axis.

4. The invention of claim 1 or 2 wherein said periodic oscillations are in the form of a sinusoid.

5. The invention of claim 2 or 3 wherein said panel is in the shape of a plane curve about a line parallel to said axis.

6. The invention of claim 2 or 3 wherein said facing sheets are comprised of a plurality of boron filaments embedded in aluminum and said core is comprised of titanium.

* * * * *